(12) United States Patent
Kim et al.

(10) Patent No.: US 8,688,985 B2
(45) Date of Patent: Apr. 1, 2014

(54) DATA SECURITY METHOD AND APPARATUS USING A CHARACTERISTIC PRESERVING ENCRYPTION

(75) Inventors: Duk-Soo Kim, Seoul (KR); Seok-Woo Lee, Seoul (KR); Eui-Seok Kim, Seoul (KR); Tae-Joon Jung, Seoul (KR)

(73) Assignee: Penta Security Systems Inc., Seoul (KR)

( * ) Notice: Subject to any disclaimer, the term of this patent is extended or adjusted under 35 U.S.C. 154(b) by 0 days.

(21) Appl. No.: 13/465,081

(22) Filed: May 7, 2012

(65) Prior Publication Data

US 2012/0324215 A1 Dec. 20, 2012

(30) Foreign Application Priority Data

Jun. 14, 2011 (KR) .................. 10-2011-0057363

(51) Int. Cl.
*H04L 9/32* (2006.01)
(52) U.S. Cl.
USPC .............................. 713/168; 713/150; 380/42
(58) Field of Classification Search
None
See application file for complete search history.

(56) References Cited

U.S. PATENT DOCUMENTS

| | | | | |
|---|---|---|---|---|
| 5,673,319 | A * | 9/1997 | Bellare et al. ................ | 713/181 |
| 7,418,098 | B1 * | 8/2008 | Mattsson et al. ............. | 380/28 |
| 2005/0147240 | A1 * | 7/2005 | Agrawal et al. ............. | 380/28 |
| 2008/0082834 | A1 * | 4/2008 | Mattsson ..................... | 713/189 |
| 2008/0133935 | A1 * | 6/2008 | Elovici et al. ................ | 713/193 |
| 2008/0170693 | A1 * | 7/2008 | Spies et al. .................. | 380/277 |
| 2010/0074441 | A1 * | 3/2010 | Pauker et al. ................ | 380/45 |
| 2010/0284532 | A1 * | 11/2010 | Burnett et al. ............... | 380/28 |
| 2011/0246315 | A1 * | 10/2011 | Spies et al. .................. | 705/16 |

FOREIGN PATENT DOCUMENTS

KR 10-2008-0069727 A 7/2008

OTHER PUBLICATIONS

Rogaway, "A Synopsis of Format-Preserving Encryption," Department of Computer Science, University of California, Davis, Mar. 27, 2010.*
Spies, "Format Preserving Encryption," Voltage Security, Dec. 2008, Online: Jan. 30, 2013, Retrieved: [http://157.238.212.45/pdf/Voltage-Security-WhitePaper-Format-Preserving-Encryption.pdf].*
Bellare, et al. Format-Preserving Encryption, SAC 2009, LNCS 5867, pp. 295-312.*
Il-Seok Koh, Application No. 10-2007-007285, KIPO, Published Jul. 29, 2008, Machine Translated Jan. 30, 2013.*
R. Agrawal, et al. "Order Preserving Encryption for Numeric Data," SIGMOD Jun. 13-18, 2004.*

* cited by examiner

*Primary Examiner* — Nadia Khoshnoodi
*Assistant Examiner* — Robert Leung
(74) *Attorney, Agent, or Firm* — Rabin & Berdo, P.C.

(57) ABSTRACT

Provided is a data security method and apparatus using a characteristic preserving encryption. The data security apparatus includes an interface communicating with a user terminal or a database server, an input unit receiving information, an output unit outputting information, an encryption unit encrypting data in the data security method, a storage unit storing information, and a control unit controlling functions of the interface, the input unit, the output unit, the encryption unit or the storing unit.

2 Claims, 4 Drawing Sheets

DATA SECURITY METHOD AND APPARATUS USING A CHARACTERISTIC PRESERVING ENCRYPTION

BACKGROUND

1. Field of the Invention

The present invention relates to a method and an apparatus for data security, and particularly, to a data security method and apparatus using a characteristic preserving encryption.

2. Discussion of the Related Art

Generally, a related art encryption for data security uses a method of changing a format and a length of a data. Therefore, a schema of a database is required to be changed for preserving compatibility between the existing database and another database having a different schema.

Accordingly, a data encryption is not applied to a traditional database server. Even though it is possible to apply the data encryption, the schema of the data is required to be changed. Therefore, a traditional command inputted for reading or inputting data needs be changed in accordance with the changed schema.

Therefore, recently, a separate encryption and decryption module is included in a database server in which a traditional command inputted for reading or inputting data is not changed. Even when such a method is applied, the existing schema of a data table needs be changed after an encryption. Accordingly, it is required to generate a view which has the same schema as that of a table before a change. Even in this case, the change of a database server is required in schema.

Due to the above-described limitations, a data encryption is not applied in a database server which has a complicated data schema and is used in the financial industry or the SAP ERP (Enterprise Resource-Planning) In the SAP ERP, it is impossible to change the internal schema of data.

Even though a data security is applied, when an encryption and a decryption perform in a database server, a arithmetic operation for an input/a reading performs. Therefore, a further load which does not exist before the encryption is generated in the database server. This causes performance degradation of an environment of the server. This is one of the reason that they are reluctant to use the related art encryption.

When a data encryption is performed, a sequence of a source data is not maintained. In this case, a use of an index search is impossible. Therefore, after the data encryption, a time for searching a data is longer than before. This is one of weaknesses of the related art encryption.

Even though data is encrypted, if a use authority for an encryption data is not managed, the encryption data may be decrypted by anyone and leaked. Accordingly, when data encrypted, authority for each of the encryption data needs to be managed. However, to date, a method for solving the limitations is not provided.

SUMMARY

Accordingly, the present invention is directed to provide a data security method and apparatus using a characteristic preserving encryption that substantially obviate one or more problems due to limitations and disadvantages of the related art.

An aspect of the present invention is directed to provide a data security method and apparatus using a characteristic preserving encryption, which can maintain the characteristic of source data even after an encryption, tighten a use authority for encrypted data, and support the quick search of data through index search.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a data security method including: receiving a source data transferred from the user terminal; generating a random reference data which has a length and a format that are the same as a length and a format of the source data, generating a mapping table with the reference data and the source data mapped therein, and encrypting the mapping table to encrypt the source data with the length and the format of the source data being maintained; saving a use authority information which has at least one of generator information or reader information, wherein the use authority information denotes information on a use authority for using an encrypted data, the generator information denotes information on a user which requests the encryption, and the reader information denotes information on a user which is allowed to read the source data; and transmitting the encrypted data to the user terminal to be transmitted to the database server, or transmitting the encrypted mapping table to the database server to be saved.

In another aspect of the present invention, there is provided a data security apparatus including: an interface communicating with a user terminal or a database server; an input unit receiving information; an output unit outputting information; an encryption unit encrypting data in the data security method; a storage unit storing information; and a control unit controlling functions of the interface, the input unit, the output unit, the encryption unit or the storing unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an embodiment of the present invention will be described with reference to the accompanying drawings.

Figure 1:
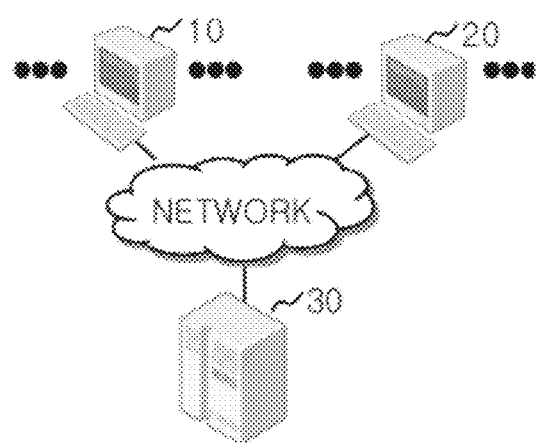
FIG. 1 is a block diagram illustrating an encryption system applying a data security apparatus using a characteristic preserving encryption according to an embodiment of the present invention.
Figure 2:
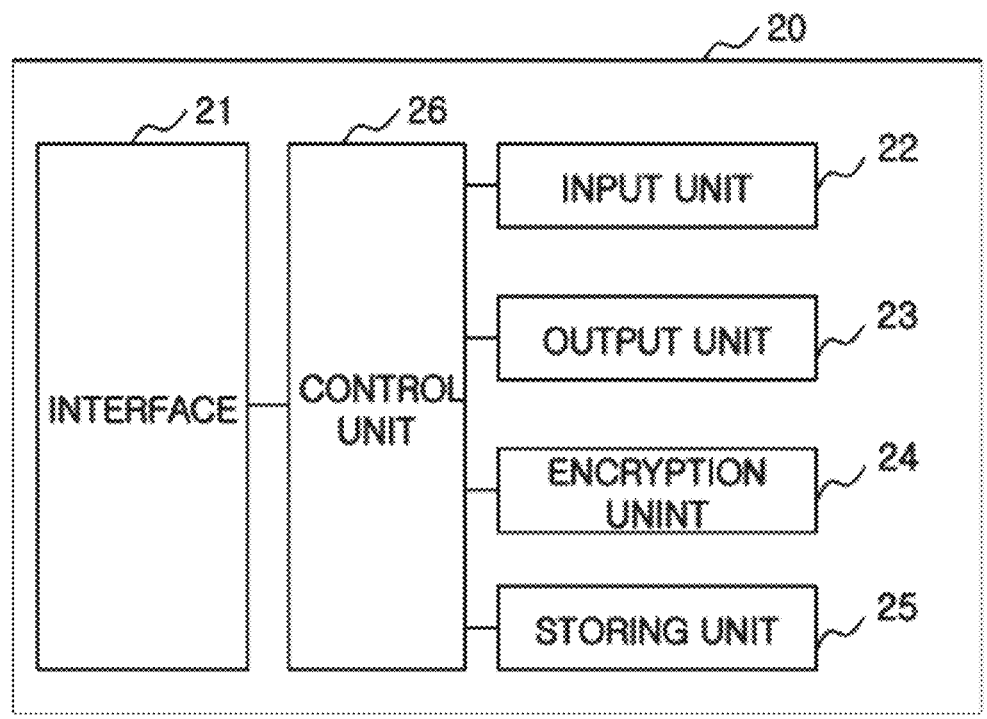
FIG. 2 is a block diagram illustrating an internal parts of the data security apparatus using a characteristic preserving encryption according to an embodiment of the present invention.

FIG. 1 is a block diagram illustrating an encryption system applying a data security apparatus using a characteristic preserving encryption according to an embodiment of the present invention. FIG. 2 is a block diagram illustrating an internal parts of the data security apparatus using a characteristic preserving encryption according to an embodiment of the present invention.

An encryption system applying the data security apparatus includes a user terminal 10 which a user uses in order to generate various source data, a data security apparatus 20 which encrypts the source data generated in the user terminal by using a characteristic preserving encryption to generate an encrypted data (hereinafter referred to as an encrypted data) according to a request transferred from the user terminal 10 and a database server 30 saving and managing the encrypted data.

The user terminal 10 generates various kinds of source data by using various kinds of applications. Generally used personal computer (PC) may be used as the user terminal 10. That is, the user terminal 10 generates various kinds of source data with various kinds of format by using a Hangeul Office or Microsoft Office or any other various applications. However, wireless terminal such as a tablet PC may be used as the user terminal 10, in which case the user terminal communicates with the data security apparatus 20 or the database server 30 by using wireless network to transmit or receive the source data.

The data security apparatus 20 encrypts the source data transferred from the user terminal 10 by using a data security method using a characteristic preserving encryption according to the present invention. The data security apparatus 20 transmits an encrypted data to the database server 30 after encrypting the source data.

As illustrated in FIG.2, the data security apparatus 20 includes an interface 21, an input unit 22, an output unit 23, an encryption unit 24, a storing unit 25 and control unit 26.

Herein, the interface 21 communicates with the user terminal 10 or database server 30. That is, the interface 21 communicates with the user terminal 10 or database server 30 by using wire network such as internet or wireless network such as Wifi (wireless fidelity) or Bluetooth.

The input unit 22 lets a manager who manage the data security apparatus 20 input various kinds of information for managing the data security apparatus 20. General keyboard or touchscreen may be used as the input unit 22.

The output unit 23 lets a manager who manages the data security apparatus 20 read various kinds of a database stored in the storing unit. A monitor or a printer may be used as the output unit 23.

The encryption unit 24 encrypts the source data transferred from the user terminal 10 by using the data security method according to the present invention. It will be described with reference to FIGS. 3 to 6 that the encryption unit 2 encrypts the source data.

The storing unit 25 stores various kinds of applications which perform the data security method. In addition, the storing unit 25 stores various kinds of information requested to drive the data security apparatus.

The control unit 26 controls the above-described configurations.

The data security apparatus 20 decrypts the encrypted data transferred from the database server 30 in accordance with a control signal transferred from the database server 30 to transmit a decrypted data to the user terminal 10.

That is, every data transferred from or to the user terminal 10 is a source data, and every data transferred from or to the database server 30 is an encrypted data. The data security apparatus 20 encrypts the source data or decrypts the encrypted data between the user terminal 10 and the database server 30.

The database server 30 stores and manages the encrypted data. A General database server may be used as the database server 30.

The data security method and apparatus using a characteristic preserving encryption according to the present invention have various features.

First, the data security apparatus 20 according to the present invention is separate from the database server 30. Therefore, the data security apparatus 20 may perform an operation of an encryption and a decryption without an additional load to the database server 30. In this case, the data security apparatus 20 according to the present invention may encrypt the source data without changing a schema of the database server 30 to store the encrypted data in the database server 30 by using the data security method which makes the encrypted data to have a characteristic of the source data (for example, a length or a format of the source data).

Second, the data security apparatus 20 according to the present invention encrypts the source data and manages an information on a use authority of the encrypted data (for example, the information includes at least one of a generator information or a reader information). Therefore, the data security apparatus 20 provides a high security for the encrypted data stored in the database server 30.

Third, the data security apparatus 20 according to the present invention uses an encryption for encrypting the latter portion of the source data, which is referred to as a partial encryption. Therefore, the present invention let the encrypted data be searched through an index search to prevent the decrease in a search speed after the encryption.

As described above, the data security method and apparatus using a characteristic preserving encryption according to the present invention may encrypt the source data without changing a schema of the database server 30 after the encryption, tighten a data security by managing the information on the use authority of the encrypted data, and let a user identically use an index searching method in order to search the encrypted data. The index searching method is used to search the source data.

The present invention is based on the characteristic preserving encryption of the first feature, and combines it with at least one of the second feature(tightening the use authority of the encrypted data) or the third feature(the partial encryption) to tighten the security of the encrypted data. The first embodiment of the present invention is the data security method using the characteristic preserving encryption and the use authority tightening. The second embodiment of the present invention is the data security method using the characteristic preserving encryption, the use authority tightening and the partial encryption.

Moreover, the characteristic preserving encryption applied to the present invention may be assorted into two methods. Therefore, the present invention may be assorted into four embodiments.

In the below description, the three features described above (the characteristic preserving encryption, the use authority tightening and the partial encryption) will be described in detail with reference to FIGS. 3 to 6 and then four embodiments according to the present invention will be described in detail.

Figure 3:
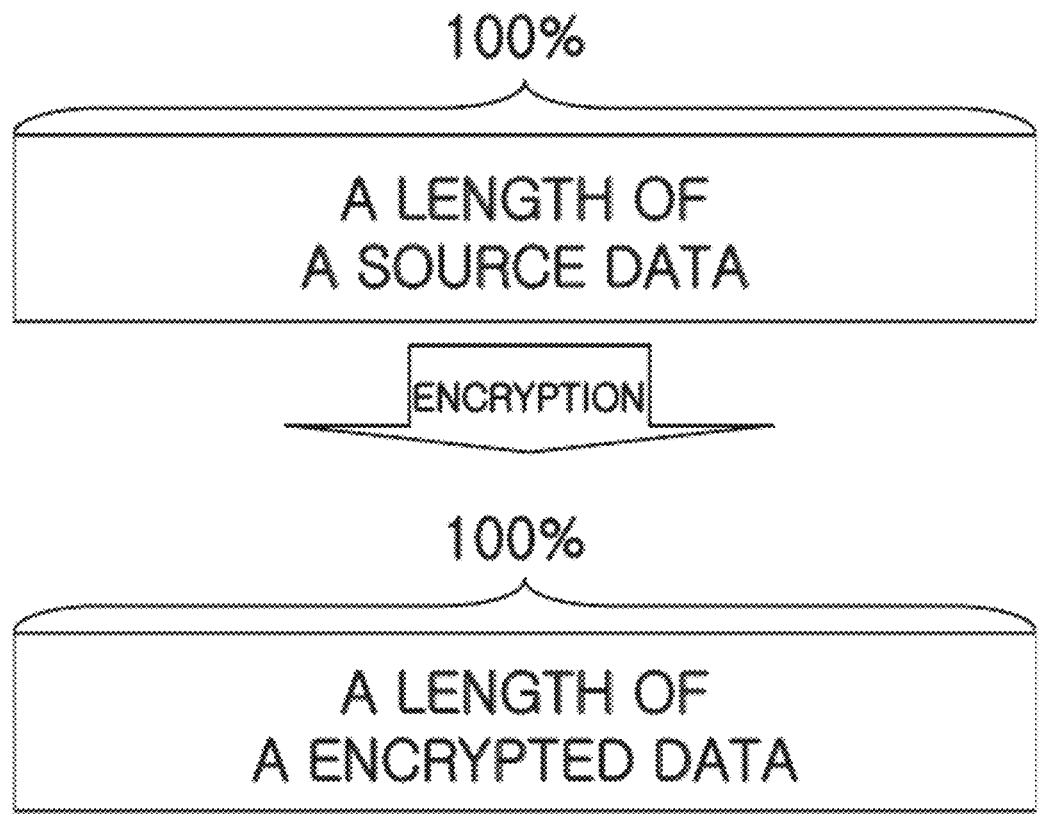
FIG. 3 is an exemplary diagram illustrating a characteristic preserving encryption preserving a characteristic of a source data on which the present invention is based.

FIG. 3 is an exemplary diagram illustrating a characteristic preserving encryption preserving a characteristic of a source data on which the present invention is based.

The present invention may encrypt a source data without changing a schema of the database server 30 to store the encrypted data in the database server 30 by using the encryption which makes the encrypted data to have a characteristic of the source data (for example, a length or a format of the source data) after an encryption or a decryption.

Particularly, the present invention may use an encryption which maintains a length or a format of the source data in order to encrypt the source data, preserving the length or format of the source data.

Therefore, as illustrated in FIG.3, a length of the source data and a length of the encrypted data are equal.

Figure 4:
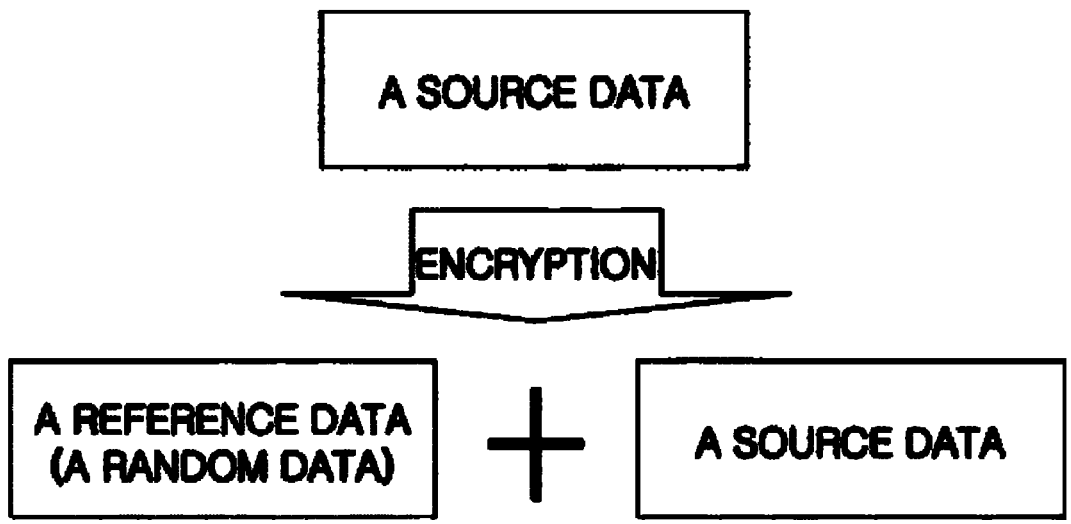
FIG. 4 is another exemplary diagram illustrating a characteristic preserving encryption preserving a characteristic of a source data, the present invention being based on the method.

FIG. 4 is another exemplary diagram illustrating a characteristic preserving encryption preserving a characteristic of a source data, the present invention being based on the method.

The present invention may use an encryption which is maintains a length and a format of a source data as described with reference to FIG. 3 in order to encrypt the source data, preserving a characteristic of the source data. However, the present invention may use a method which encrypts and decrypts a mapping table as described below. Herein, a reference data and the source data are mapped in the mapping table.

The present invention, as illustrated in FIG. 4, randomly generates the reference data which has a length and a format that are the same as a length and a format of the source data. Also, the present invention generates the mapping table with the reference data and the source data mapped therein.

The present invention may encrypt the mapping table to store an encrypted mapping table in the data security apparatus 20 in order to safely manage the reference data and the source data.

Figure 5:
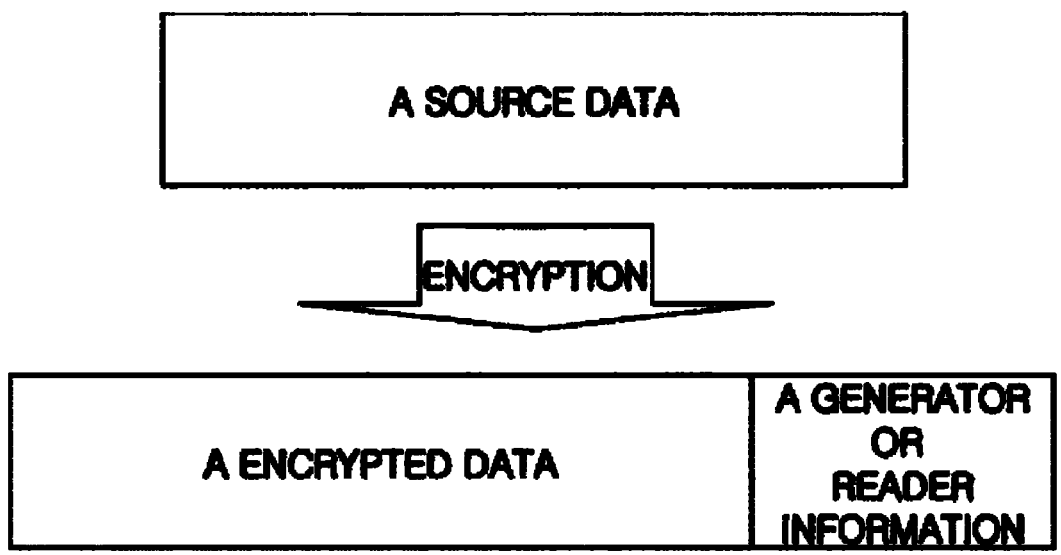
FIG. 5 is an exemplary diagram for describing the use authority tightening which is one of the data security methods according to the present invention.

FIG. 5 is an exemplary diagram for describing the use authority tightening which is one of the data security methods according to the present invention.

As illustrated FIG. 5, the present invention may save the use authority information with the encrypted data to manage them together when the encryption progresses. Herein, the use authority information denotes information on a use authority of the encrypted data. That is, the use authority information comprises at least one of a generator information or a reader information. The present invention may save the encrypted data and the generator information which is information on a generator who requests the encryption. Also, the present invention may save the encrypted data and the reader information which is information on a reader who is allowed to decrypt and read the encrypted data. Therefore, the present invention separately manages a use authority of the respective encrypted data.

Therefore, as illustrated in FIG.5, only a generator whose information is saved with the encrypted data may decrypt the encrypted data to read the decrypted data. Also, a reader whose information is saved with the encrypted data may decrypt the encrypted data to read the decrypted data.

Figure 6:
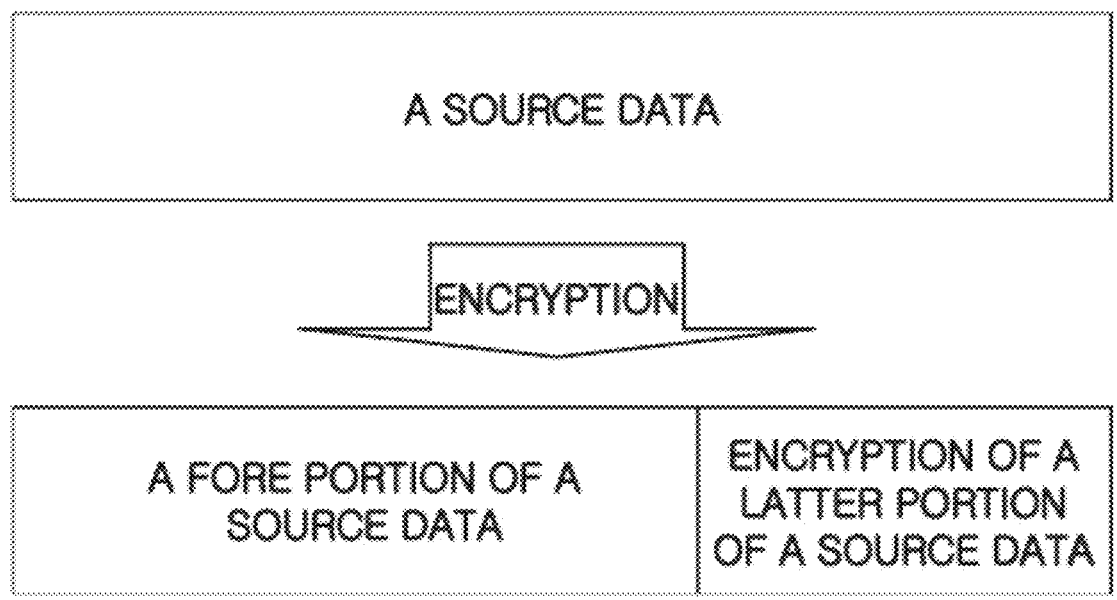
FIG. 6 is a exemplary diagram for describing the partial encryption which is one of the data security methods according to the present invention.

FIG. 6 is a exemplary diagram for describing the partial encryption which is one of the data security methods according to the present invention.

That is, the present invention, as illustrated in FIG. 6, uses encryption of encrypting the latter portion of the source data, which is referred to as a partial encryption; therefore, the present invention make it possible to search the encrypted data through an index search and make it possible to search a data at high speed after the encryption.

To provide an additional description, the data security apparatus 20 encrypts a source data inputted thereto by using the encryption preserving a length and a format of a source data. When the source data is encrypted, the data security apparatus 20 does not encrypt the fore portion of the source data but encrypts the latter portion of the source data. Therefore, it is possible to search the encrypted data through an index search.

Hereinafter, the data security method according to the present invention using the three features described above will be described in detail by each embodiment.

The data security method according to the first embodiment of the present invention uses the characteristic preserving encryption and manages the use authority information; therefore, the data security method tightens a data security. Herein, the use authority information is managed together with an encrypted data. Also, the characteristic preserving encryption is described above with reference to FIG. 3 and the use authority information is described above with reference to FIG. 5.

A concrete method of the first embodiment will be provided blow.

First, the data security apparatus 20 according to the present invention encrypts a source data by using the method which maintains a length and a format of the source data as described with reference to FIG. 3, and the data security apparatus 20 transmits an encrypted data to the database server 30.

Second, as illustrated in FIG. 5, an information on a user which requests the encryption is saved as the generator information. Herein, the user is called as a generator.

Third, as illustrated in FIG. 5, an information on a user which is allowed to read an encrypted data is stored as a reader information. Herein, the user is called as a reader.

Fourth, only the registered generator and reader are allowed to read the encrypted data.

That is, when the source data is encrypted, the first embodiment according to the present invention stores an information on the user which requests the encryption as the generator information and stores an information on the user which is allowed to decrypt an encrypted data to read a decrypted data as a reader information, and therefore, may separately manage a use authority by each encrypted data.

Therefore, in the first embodiment according to the present invention, as illustrated in FIG.5, only the generator and the reader may decrypt the encrypted data to read the decrypted data.

The data security method according to the second embodiment of the present invention uses the characteristic preserving encryption together with the use authority tightening and the partial encryption, and therefore, the data security method tightens the data security. Herein, the characteristic preserving encryption is described above with reference to FIG. 3, the use authority tightening is described above with reference to FIG. 5, and the partial encryption is described above with reference to FIG. 6. That is, when the source data is encrypted by using the characteristic preserving encryption, the security apparatus 20 particularly encrypts the latter of the source data and stores the use authority information together with the encrypted data to manage the same. Therefore, the second embodiment according to the present invention make it possible to search the encrypted data through an index search, and accordingly, make it possible to search a data at high speed after the encryption.

A concrete method of the second embodiment will be provided blow.

First, the data security apparatus 20 according to the present invention encrypts a source data inputted thereto by using the encryption which maintains a length and a format of the source data as described with reference to FIG. 3, and the data security apparatus 20 transmits an encrypted data to the database server 30.

Second, the data security apparatus 20 encrypts the source data by using the partial encryption to make it possible to search the encrypted data through an index search. Herein, the partial encryption encrypts the latter portion of the source data.

Third, as illustrated in FIG. 5, information on a user which requests the encryption is saved as generator information. Herein, the user is called as a generator.

Fourth, as illustrated in FIG. 5, information on a user which is allowed to read an encrypted data is stored as reader information. Herein, the user is called as a reader.

Fifth, only the registered generator and reader are allowed to read the encrypted data.

That is, when the source data is encrypted, the second embodiment according to the present invention uses the encryption according to the first embodiment described above with reference to FIG. 3 and FIG. 5, and furthermore, uses the partial encryption which partially encrypts the source data. Herein, the partial encryption is described above with reference to FIG. 6.

For this end, the data security apparatus 20 encrypts a source data inputted thereto by using the characteristic preserving encryption to transmit an encrypted data to the database server 30. In this case, the data security apparatus 20 simultaneously uses the partial encryption which encrypts the latter portion of the source data but does not encrypts the fore portion of the source data; therefore, the data security apparatus 20 make it possible to search the encrypted data through an index search.

The data security method according to the third embodiment of the present invention uses the characteristic preserving encryption and manages information on a use authority of the encrypted data; therefore, the data security method tightens a data security. Herein, the characteristic preserving encryption is described above with reference to FIG. 4 and the information is described above with reference to FIG. 5.

That is, the third embodiment according to the present invention combines the characteristic preserving encryption with the use authority tightening. Herein, the characteristic preserving encryption is described above with reference to FIG. 4 and the use authority tightening is described above with reference to FIG. 5. The first embodiment uses the characteristic preserving encryption described above with reference to FIG. 3, whereas the third embodiment uses the characteristic preserving encryption described above with reference to FIG. 4. To provide an additional description, the third embodiment according to the present invention uses the use authority tightening, as illustrated in FIG. 4, and the encryption which encrypts and decrypts the mapping table, as illustrated in FIG. 5. Herein, a reference data and the source data are mapped in the mapping table.

A concrete method of the third embodiment will be provided blow.

First, when the source data is inputted to the data security apparatus 20 according to the present invention, the data security apparatus 20, as illustrated in FIG. 4, randomly generates the reference data which has a length and a format that are the same as a length and a format of the source data to store a mapping table. Herein, the reference data and the source data are mapped in the mapping table.

Second, the data security apparatus 20 encrypts the mapping table to store an encrypted mapping table in the data security apparatus 20 or the database server 30 in order to safely manage the reference data, the source data and the mapping table.

Third, the data security apparatus 20 transmits the reference data to the database server 30 to be stored in the database server 30.

Fourth, as illustrated in FIG. 5, information on a user which requests the encryption is stored as a generator information. Herein, the user is called as a generator.

Fifth, as illustrated in FIG. 5, information on a user which is allowed to read an encrypted data is stored as a reader information. Herein, the user is called as a reader.

Sixth, only the registered generator and reader are allowed to decrypt the encrypted mapping table to read the source data. Herein, the source data and the reference data are mapped in the mapping table.

The data security method according to the fourth embodiment of the present invention uses the characteristic preserving encryption together with the use authority tightening and the partial encryption, and therefore, the data security method tightens the data security. Herein, the characteristic preserving encryption is described above with reference to FIG. 4, the use authority tightening is described above with reference to FIG. 5, and the partial encryption is described above with reference to FIG. 6. That is, the data security method according to the fourth embodiment of the present invention uses the characteristic preserving encryption as illustrated in FIG. 4, the use authority tightening as illustrated in FIG. 5 and the partial encryption as illustrated in FIG. 6.

A concrete method of the fourth embodiment will be provided blow.

First, when the source data is inputted to the data security apparatus 20 according to the present invention, the data security apparatus 20, as illustrated in FIG. 4, randomly generates the reference data which has a length and a format that are the same as a length and a format of the source data to save a mapping table. Herein, the reference data and the source data is mapped in the mapping table.

Second, the data security apparatus 20 maintains the fore portion of the reference data equal to the fore portion of the source data and randomly generates the latter portion of the reference data to make it possible to search the reference data through an index search.

Third, the data security apparatus 20 encrypts the mapping table to store an encrypted mapping table in the data security apparatus 20 or the database server 30 in order to safely manage the reference data, the source data and the mapping table.

Fourth, the data security apparatus 20 transmits the reference data to the database server 30 to be stored in the database server 30.

Fifth, the data security apparatus 20 encrypts the source data by using the partial encryption to make it possible to search the encrypted data through an index search. Herein, the partial encryption encrypts the latter portion of the source data and does not encrypt the fore portion of the source data. The encrypted data is stored in the database server 30 or the data security apparatus. That is, the data security apparatus 20 encrypts the source data. The source data is encrypted by using the partial encryption. Also, the data security apparatus 20 transmits an encrypted data to the database server to be stored in the database server 30 or stores in the data security apparatus.

Sixth, as illustrated in FIG. 5, information on a user which requests the encryption is stored as a generator information. Herein, the user is called as a generator.

Seventh, as illustrated in FIG. 5, information on a user which is allowed to read the encrypted data is saved as a reader information. Herein, the person is called as a reader.

Eighth, only the registered generator and reader are allowed to decrypt the encrypted mapping table and the encrypted data to read the source data. Herein, the source data and the reference data are mapped in the encrypted mapping table.

The present invention, as described above, encrypts the source data and decrypts the encrypted data by using the separate security apparatus (the data security apparatus 20 using the characteristic preserving encryption). Accordingly, the present invention resolves the problems of the related art database server which encrypts the source data in the related art database server.

The present invention has a feature that the characteristic preserving encryption and the partial encryption is used, and the use authority tightening is used to tighten the use authority of the encrypted data.

As describe above, by preserving the characteristic of the source data even after an encryption is performed, the present invention encrypts and stores the source data without changing the schema of data or the database server. The present invention, especially, manages information on a user having the use authority of the encrypted data when the source data is encrypted, thus providing high security for the encrypted data stored in the database.

Moreover, the present invention uses a partial encryption of encrypting only the latter portion of the source data, and thus enables the index search even for encrypted data, thereby preventing the decrease in a search speed after the encryption.

What is claimed is:

1. A data security method using a characteristic preserving encryption performed in a data security apparatus disposed separately from a user terminal and a database server, the data security method comprising:

receiving by the data security apparatus a source data transferred from the user terminal;

generating by the data security apparatus a reference data with a random data, wherein a length and a format of the reference data are the same as a length and a format of the source data, generating by the data security apparatus a mapping table in which the reference data and the source data are mapped, encrypting by the data security apparatus the mapping table to perform a characteristic preserving encryption for the source data;

storing by the data security apparatus the encrypted mapping table in the data security apparatus;

saving a use authority information having at least one of generator information and reader information, wherein the use authority information is information on a use authority for using an encrypted data, the generator information is information on a user requesting the encryption, and the reader information is information on a user being allowed to read the source data;

transmitting by the data security apparatus the reference data to the user terminal so that the user terminal transmits the reference data to the database server, or directly to the database server so that the database server saves the reference data in the database server; and storing by the database server the reference data in the database server.

2. The data security method of claim 1, further comprising performing by the data security apparatus a partial encryption operation of encrypting a latter portion of the source data without encrypting a fore portion of the source data.

* * * * *